United States Patent
Xenakis et al.

[15] 3,683,440
[45] Aug. 15, 1972

[54] AUTOMATIC TERMINAL BRIDGE CONTROL SYSTEM

[72] Inventors: James A. Xenakis, Roslyn Harbor; Alvin L. Zechnowitz, Monsey; Raymond L. Strazzulla, Huntington Station, all of N.Y.

[73] Assignee: Sperry Rand Corporation

[22] Filed: Oct. 13, 1970

[21] Appl. No.: 80,425

[52] U.S. Cl. .................................................. 14/71
[51] Int. Cl. ........................................... B65g 11/00
[58] Field of Search ........................................... 14/71

[56] References Cited

UNITED STATES PATENTS

| | | | |
|---|---|---|---|
| 3,038,185 | 6/1962 | Moore | 14/71 |
| 3,310,823 | 3/1967 | Preiss | 14/71 |
| 3,462,784 | 8/1969 | Seipos | 14/71 |
| 3,543,318 | 12/1970 | Tushim | 14/71 |

*Primary Examiner*—Jacob L. Nackenoff
*Attorney*—S. C. Yeaton

[57] ABSTRACT

Apparatus for aligning one or more motorized terminal bridges to one or more doors in a vehicle enabling the loading and unloading of passengers and freight. The apparatus includes control circuits responsive to signals from a remotely located control panel which provides drive signals used in the initial positioning of each bridge. An electro-optical device in each bridge is locked onto a reflective type material affixed to the vehicle in the vicinity of each door. Transducers mounted in various sections of the bridges determine the spatial position of the bridges with respect to the terminal after initial positioning. The transducers cooperate with the electrooptical device to produce drive signals that steer and control the speed of each bridge until pressure contacts on each bridge indicate precise alignment with each door.

11 Claims, 9 Drawing Figures

PATENTED AUG 15 1972

INVENTORS
JAMES A. XENAKIS
ALVIN L. ZECHNOWITZ
RAYMOND L. STRAZZULLA
BY

*H.P. Terry*

ATTORNEY

INVENTORS
JAMES A. XENAKIS
ALVIN L. ZECHNOWITZ
RAYMOND L. STRAZZULLA
BY

ATTORNEY

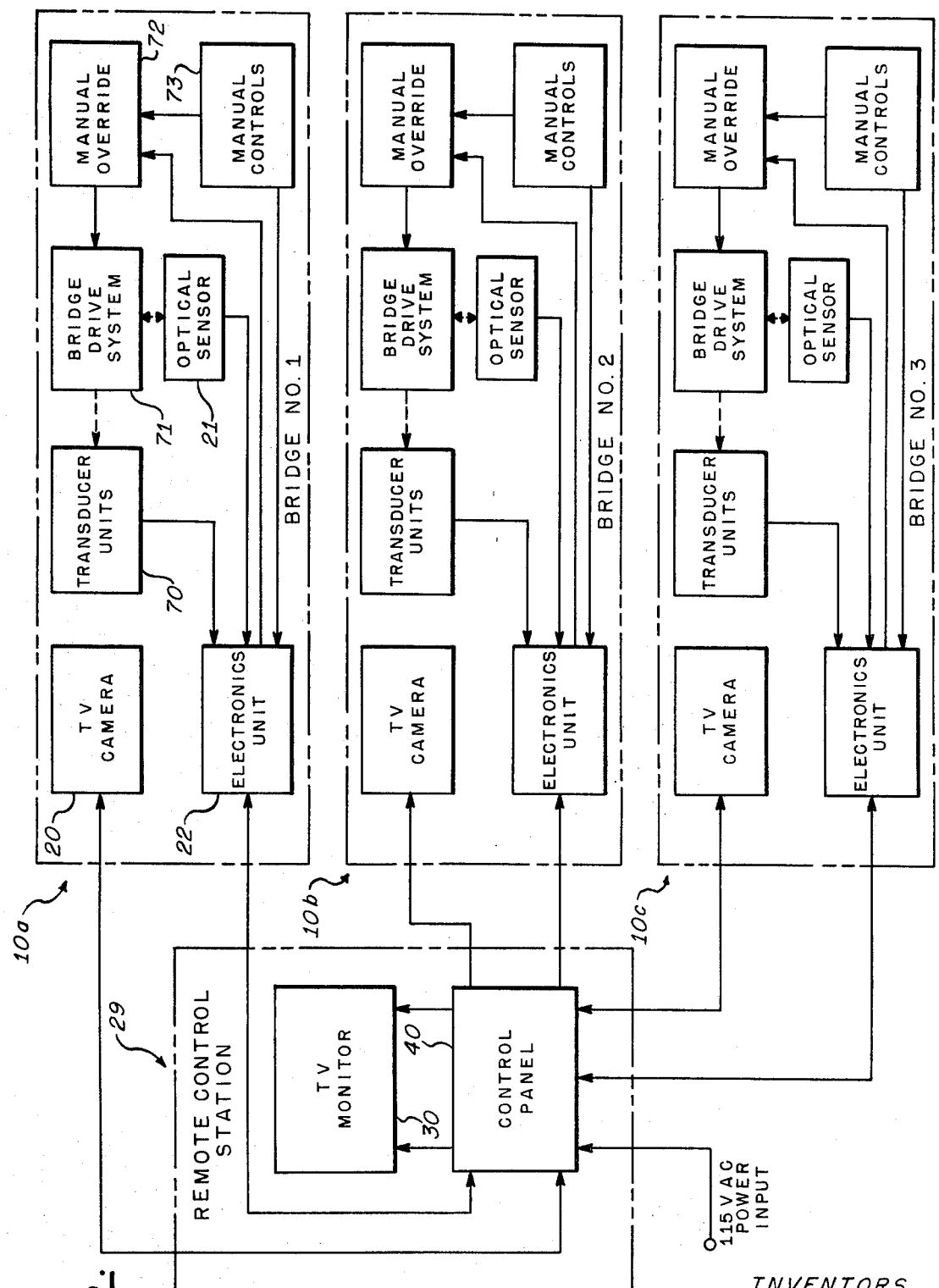

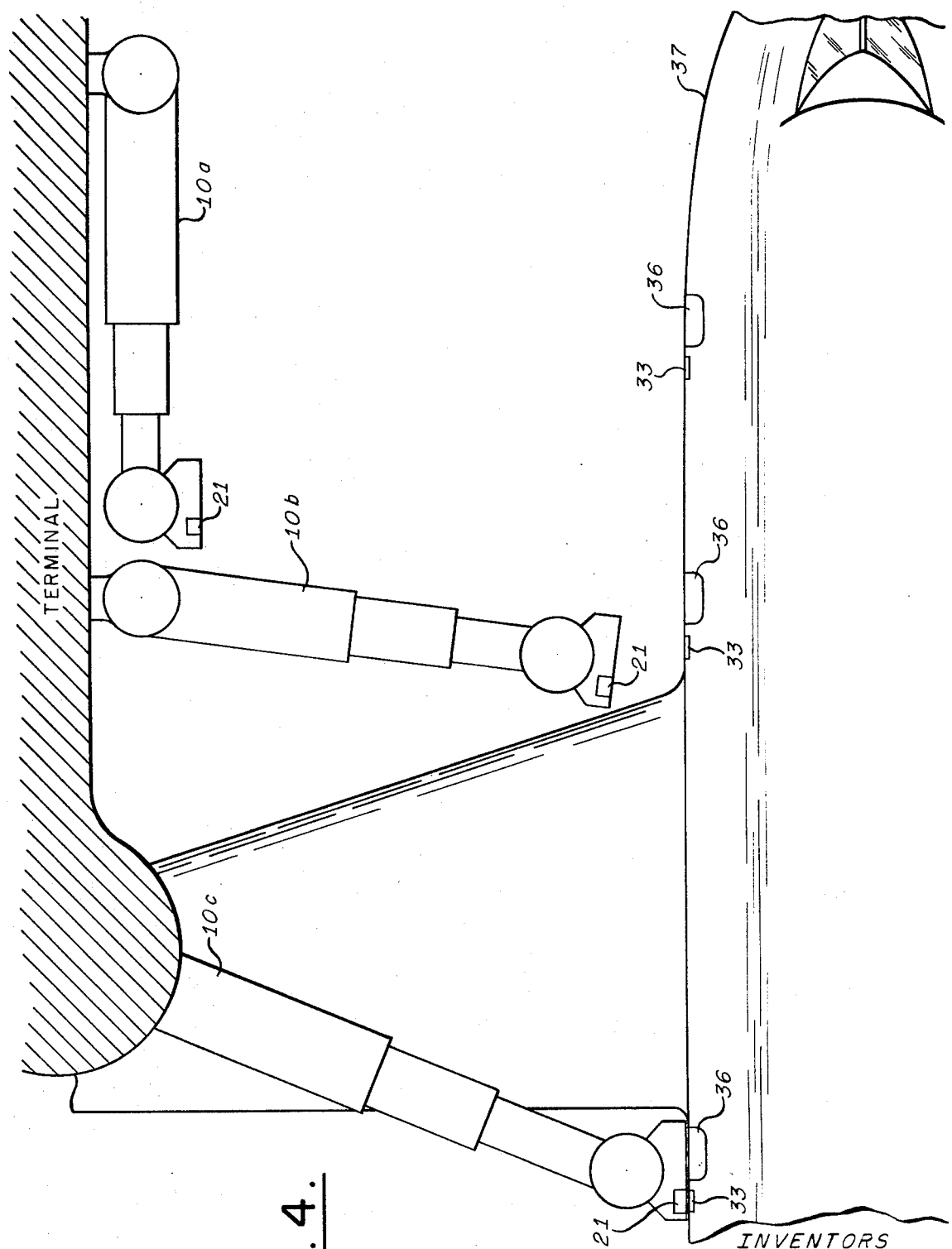

AUTOMATIC TERMINAL BRIDGE CONTROL SYSTEM

BACKGROUND OF THE INVENTION

1. Field of the Invention

The disclosed apparatus pertains to the art of motorized terminal bridges and particularly to apparatus used to align these bridges to doors or openings in vehicles or vessels.

2. Description of the Prior Art

Currently, motorized bridges are being used in increasing numbers in airline terminals to provide a means for loading and unloading passengers and freight. These bridges are enclosed and rotatably fixed at one end to a terminal building. An expandable and retractable section connects the fixed end of the bridge to a rotatable cab at the movable end. The bridge is controlled by an operator located in the cab who relies on his visual observation of a parked aircraft in mating the bridge to the aircraft. Controls in the cab enable the operator to rotate the bridge or the cab, extend or retract the connecting passageway and adjust the height of the bridge for alignment with the door on each different type of aircraft. Since present day jet aircraft carry a large number of passengers two or three doors are used to minimize the time required for deplaning and loading. As a result, two or three bridges are used to mate with the doors and each bridge requires an operator. Windows and periscopes in the cab enable the operator to view the area around the bridge and aircraft for clearance prior to moving the bridge. Usually, the area in which the parked aircraft is located has a number of other operating personnel and vehicles thereby increasing the task of the operator in positioning the bridge safely. Due to these obstacles and the limited physical capabilities of the operator, his control functions are usually performed sequentially rather than simultaneously. Further, when the cab of the bridge is brought into the vicinity of the vehicle door, there is no means presently available to precisely align the cab with the door. In many instances, there is a displacement laterally or vertically between the cab and the door imposing an inconvenience on the passengers which increases the time required to deplane and board. Additionally, while the aircraft is being loaded or unloaded, its height changes in proportion to the weight added or removed which is compensated for by the bridge. Presently, an auxiliary system uses a roller positioned at the front of the cab to contact the side of the aircraft and sense any change in its height. The roller produces signals in accordance with these changes and feeds back signals to automatically vary the height of the bridge correspondingly.

SUMMARY OF THE INVENTION

The subject invention provides automated control of drive signals used to align the cab of a terminal bridge with a door in a parked vehicle. It includes positional transducers which are coupled to various movable sections of the bridge including the rotatable end of the bridge attached to the terminal, the expandable length passageway, the rotatable cab and the variable height hydraulic cylinders connecting the truck which supports the bridge to the passageway. These transducers produce voltages indicative of the spatial position of the bridge as determined by the orientation of the various movable sections. A television camera mounted in the cab enables an operator stationed at a remotely located control panel to view the area around the bridge on a television monitor. The cab can be rotated from the control panel as the operator views the monitor. Control circuits located in an electronics unit under the cab respond to signals from the control panel to produce initial positioning signals that rotate the bridge away from the terminal, extend the passageway, and align an electro-optical device to reflective type material affixed to the aircraft in the vicinity of the door. Positional voltages provided by the transducers and electro-optical device are processed in logic circuits disposed in the electronics unit that function in a prescribed manner to produce drive signals. These drive signals guide the bridge along a path that will bring the cab into alignment with the door. As the cab approaches the door, the speed is automatically decreased until the cab contacts the vehicle. Pressure switches mounted around the perimeter of the cab opening contact the vehicle producing control signals which rotate the cab and provide forward drive motion until complete contact of the cab opening and the vehicle is attained. A park indicator signal is then applied to the remotely located control panel and all power is turned off except that used in the control circuitry connected to the hydraulic cylinders. The electro-optical device mounted in the cab senses the height of the vehicle. If the vehicle height varies during loading or unloading, these switches provide signals to the control circuitry which will produce drive signals to the hydraulic cylinders thereby maintaining the cab at the same level as the door. The bridge is automatically retracted from the vehicle in response to a control signal from the control panel and returned to its original position prior to activation.

BRIEF DESCRIPTION OF THE DRAWINGS

FIG. 3 is a block diagram of the invention as incorporated in three terminal bridges and a control station;

FIG. 4 is a drawing which depicts a terminal having three bridges each shown in different stages of alignment with respect to a parked aircraft;

DESCRIPTION OF THE PREFERRED EMBODIMENT

Figure 1:
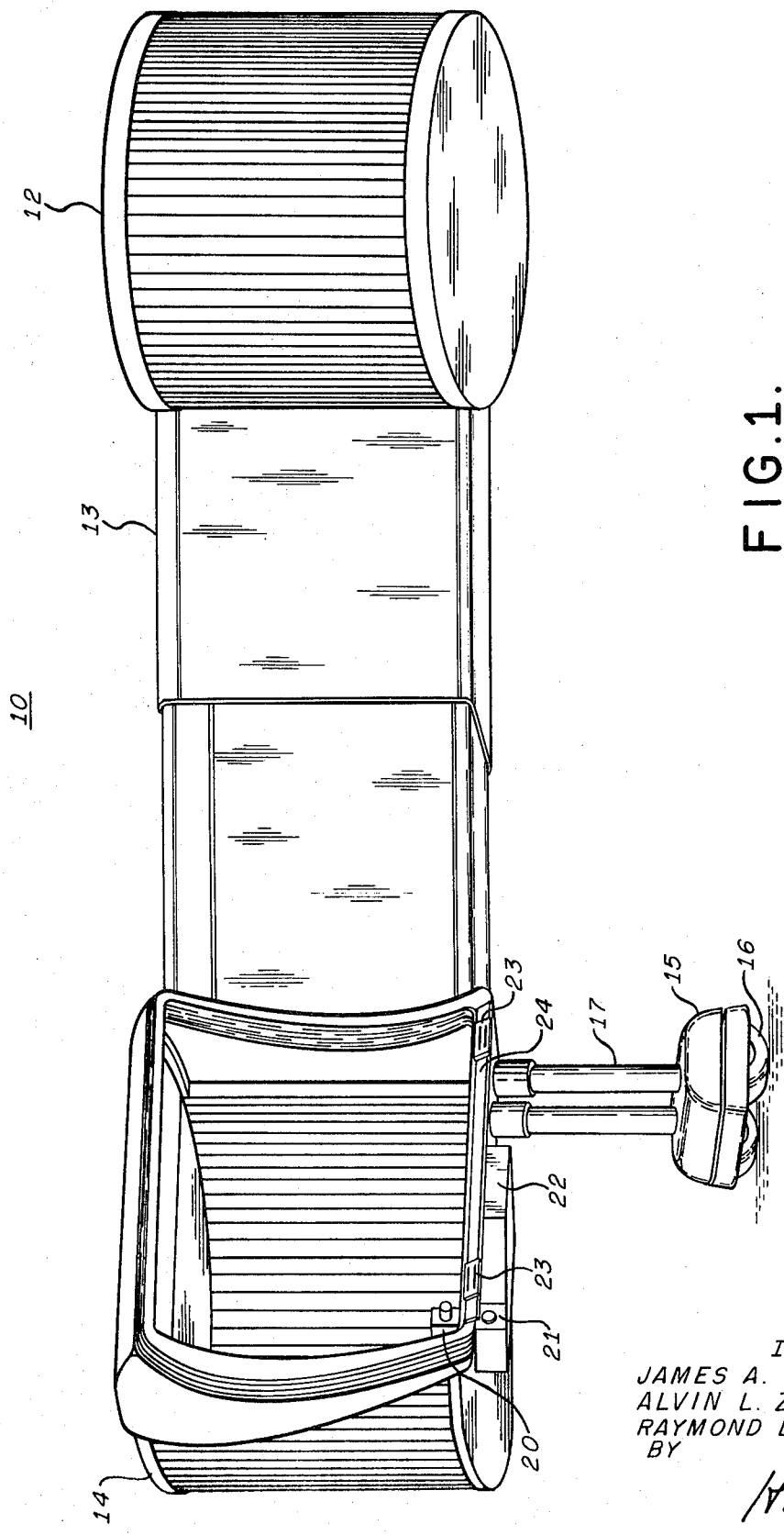
FIG. 1 is a drawing of a motorized terminal bridge showing the location of different components of the invention.
Figure 2A:
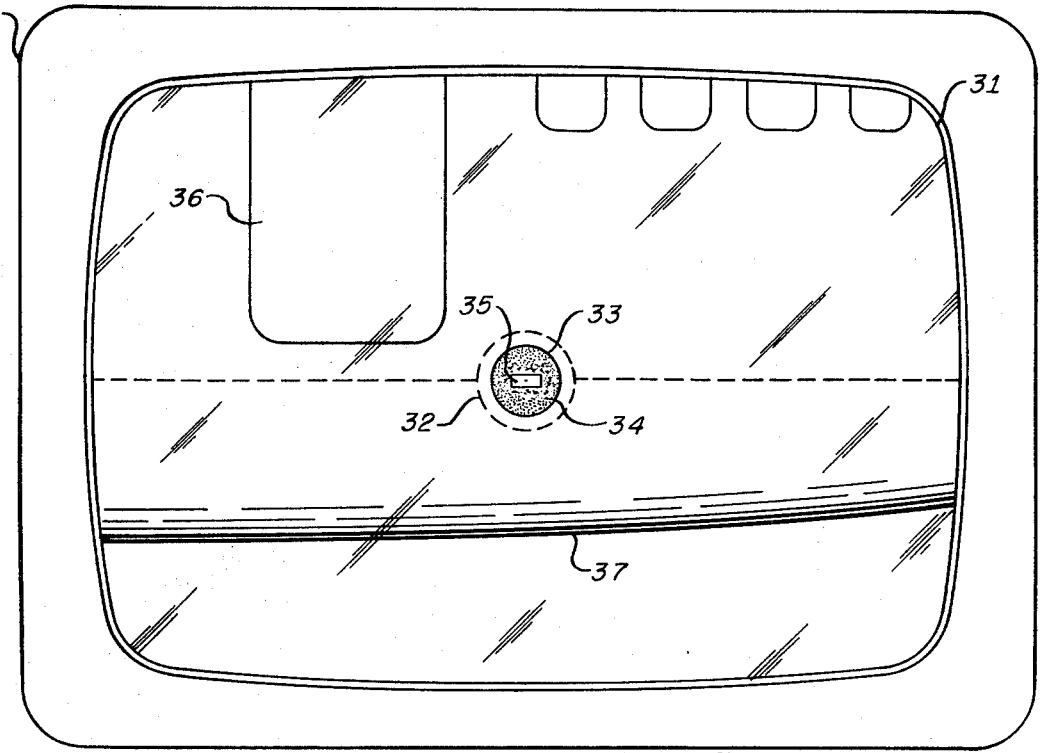
FIG. 2a is a drawing of a remotely located television monitor at a control station.

The invention will now be described with reference to the drawings. In FIG. 1, a terminal bridge 10 is shown attached to a terminal at rotatable housing 12. An expandable and retractable passageway 13 connects the housing 12 to a rotatable cab 14 having pressure switches 23 on a bumper 24 along its lower edge. The passageway 13 is supported on a truck 15 having wheels 16 through hydraulic cylinders 17 which are adjustable to vary the height of the passageway 13 from the ground. A television camera 20 is mounted at the front of the cab 14 on the floor and suspended beneath the cab 14 are an electro-optical device 21 and an electronics unit 22. FIG. 2a depicts remote control station 29 including a television monitor 30 having a screen 31 on which dashed cross hairs 32 are painted. The circular center of the cross hairs 32 is shown concentric with a marker 33 having a non-reflective outer circle 34 and a reflective type material 35 in the shape of a strip. The marker 33 is in the vicinity of a door 36 on an aircraft 37. Also located at the remote control station 29 with the television monitor 30 is a control panel 40 shown in FIG. 2b. The control panel 40 provides control of three terminal bridges 10A, 10B and 10C by a single operator. At the extreme right section of the control panel 40 are located an off/on switch 41 which may be actuated by a key, status lights 42 which provide an indication of when the control system is properly warmed-up and ready to be operated, a stand-by operate switch 43 which also may be actuated by the same key used for switch 41, and controls 51 and 52. The left section of control panel 40 is divided into three identical sections of controls and indicators for each bridge. Bridge select switch 44 enables the operator to have displayed on the television monitor 30 signals from one of the television cameras 20 mounted in each of the bridges. Each of the three identical sections are further subdivided into indicator and control sections having status lights located on the lefthand side and control switches on the righthand side of each section. An auto-manual switch 62 at the bottom of each of the three identical sections is placed in the manual position to enable manual override of the automatic system.

Figure 2B:
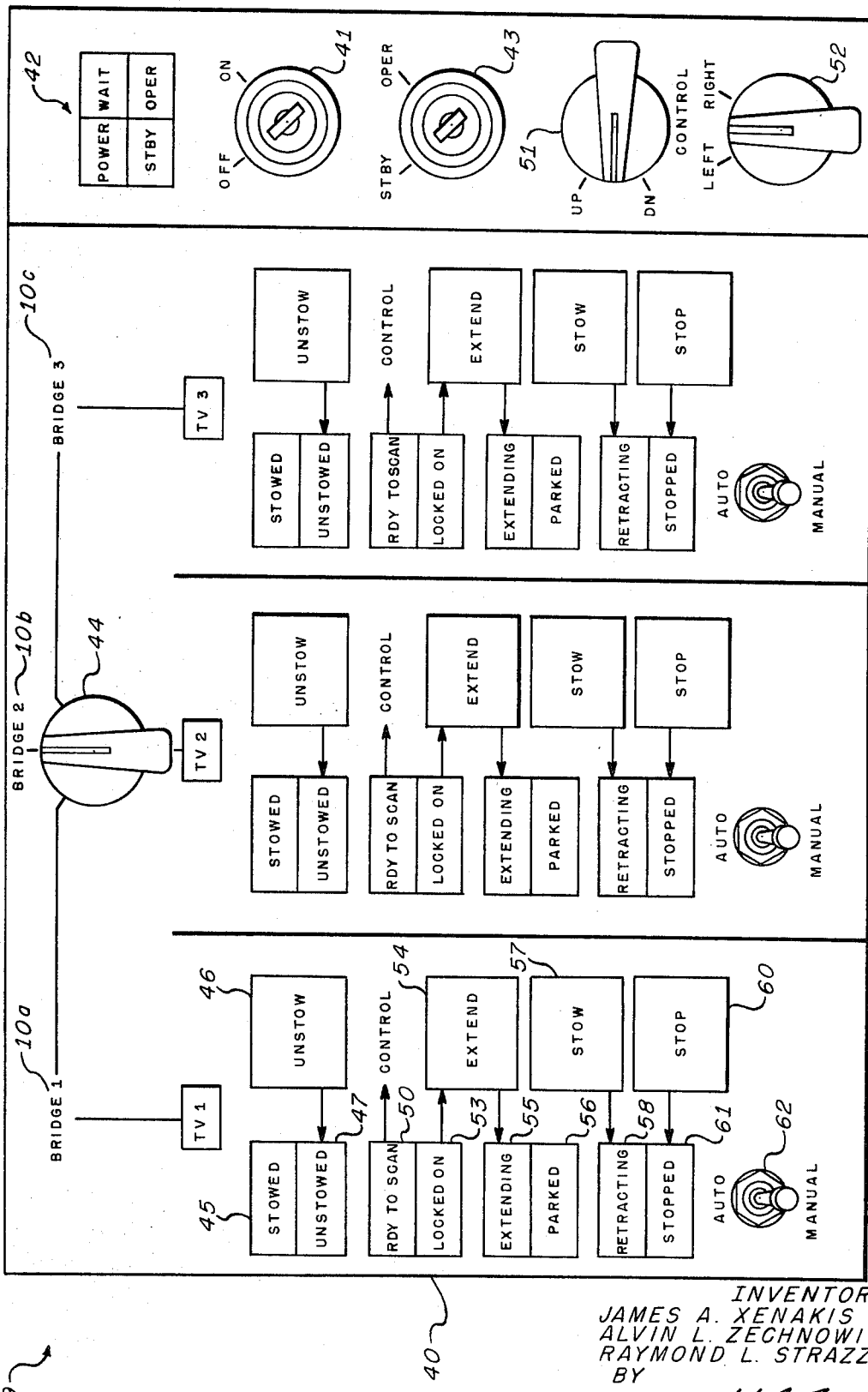
FIG. 2b is a drawing of a control panel located near the remotely located television monitor.

The block diagram of FIG. 3 illustrates the interconnections between the remote control station 29 and the terminal bridges 10A, 10B and 10C. Since the units in each bridge are identical, only those in bridge 10A will be described. The remote control station 29 includes the television monitor 30 and the control panel 40 which are also shown in FIGS. 2a and 2b respectively. The 115-volt a.c. power input applied to the control panel 40 is also routed to the television monitor 30. Control panel 40 routes received signals from the television camera 20 to the television monitor 30 for display to the operator. Actuation signals from the control panel 40 are coupled to the electronics unit 22 for processing before being routed through the manual override 72 to the bridge drive system 71. Positional voltage signals from the transducer units 70 disposed in the rotatably fixed end 12, the passageway 13, the cab 14 and the truck 15 of each terminal bridge are connected to the electronics unit 22. The optical sensor 21 provides signals that are also connected to the electronics unit 22 where they are combined with the positional signals from the transducer units 70. Drive signals produced by the electronics unit 22 are connected to the bridge drive system 71 through the manual override 72 and indicator signals provided in the electronics unit 22 are connected to the control panel 40 for display to the operator. In the event of a malfunction, the manual override 72 may be activated in each bridge or remotely from the control panel 40 by the auto-manual switch 62. The manual controls 73 may then be used by an operator positioned in the cab 14 of each bridge to align the bridge to the door 36 on the aircraft 37.

Initially, all the bridges are in the stowed position, i.e., the position of bridge 10A as shown in FIG. 4. The operator activates the automatic control system by inserting a key in switch 41 of FIG. 2b and rotating the key to the on position. Status light 42 will indicate the power is on by illuminating the power light and also indicate the warm-up period by illuminating the wait light. The operator then inserts the key into switch 43 in the stand-by position and waits until the stand-by light in status light 42 is illuminated at which time the key is turned to the operate position in switch 43. Bridge select switch 44 is turned to the position of the first bridge to be moved, for example, bridge 10A which is in the stowed position as shown in FIG. 4. The stowed light 45 will be lit for each bridge while they are in the stowed position. To initiate movement of a bridge the operator presses the unstow switch 46 in the section of the control panel corresponding to bridge 10A. The unstow switch 41 sends a control signal to the electronics unit 22 in bridge 10A which amplifies the control signals and supplies fixed drive voltages to the bridge drive system 71 via the manual override 72. These control voltages in the preferred embodiment of the invention initially position the bridge at the same unstow position, i.e., the position of bridge 10B in FIG. 4, regardless of the type of aircraft being serviced. An alternate embodiment of the invention provides selectable control voltages scaled to each different type of aircraft to be serviced. Prior to unstowing, the bridge selector switch, not shown, is placed in a position corresponding to the particular type of parked aircraft 37 and drive voltages scaled to the aircraft 37 are selected in the electronics unit 22 and subsequently applied to the bridge drive system 71. As a result, the unstow position of the bridge is different for each type of aircraft.

When the bridge 10A is positioned in accordance with the unstow control voltages, the unstowed light 47 and the ready-to-scan light 50 are illuminated. At this time, the operator views the area around the bridge 10A through the monitor 30. He then positions the circular center of the cross hairs 32 on the marker 33 by rotating the cab with the control 52 and raising and lowering the bridge with the control 51. The controls 51 and 52 send control signals from the remote control station 29 to the electronics unit 22 in the bridge 10A where they are amplified into drive signals and applied via the manual override 72 to the bridge drive system 71. Alignment of the electro-optical device 21 with the reflective material 35 is indicated by the locked on light 53 being illuminated. The operator then presses the extend switch 54 and the extending light 55 becomes illuminated indicating there is no further requirement for operator intervention on the bridge 10A unless a malfunction occurs necessitating manual control. Consequently, the operator repeats the foregoing steps on the other bridges 10B and 10C until all of the bridges are mated with the aircraft 37, i.e., the position of bridge 10C in FIG. 4.

Figure 5:
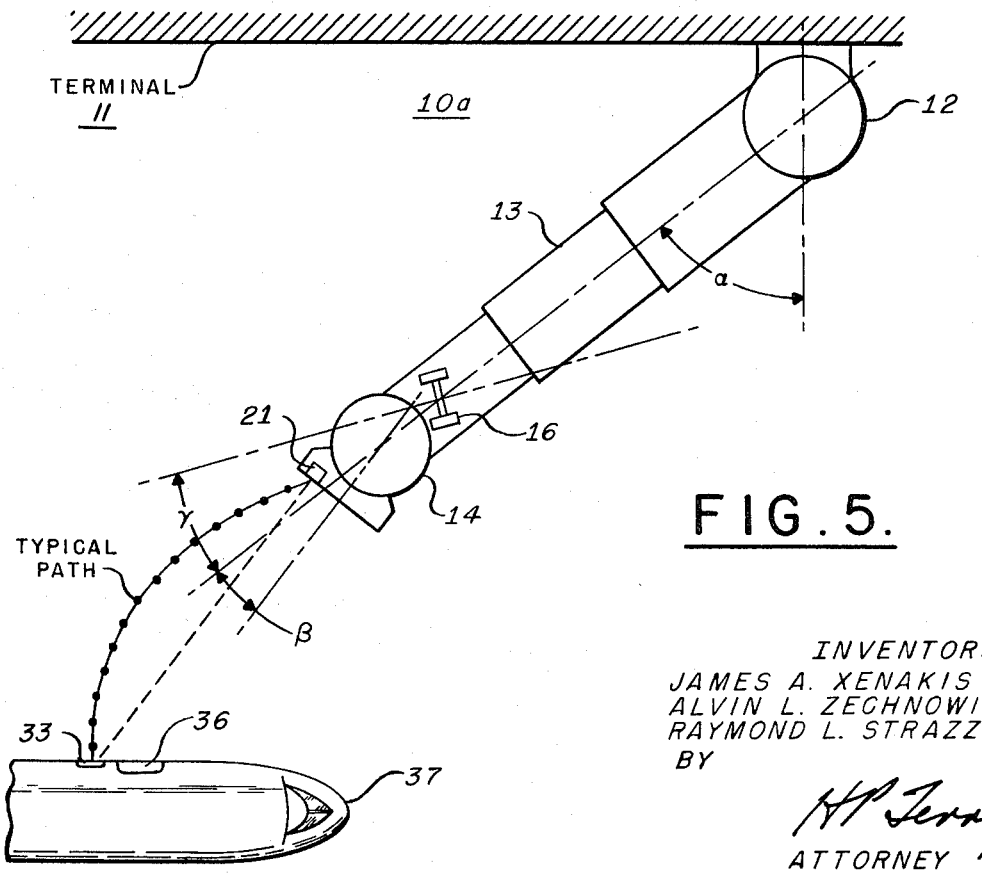
FIG. 5 is a drawing of a terminal bridge controlled by the subject invention in its unstowed position as defined by angles $\alpha$, $\beta$, and $\gamma$ and a typical path traversed in mating with a vehicle.

The operation of the control system during the extending cycle will now be described with reference to FIGS. 3 and 5. A control signal from the extend switch 54 on control panel 40 in FIG. 2b is sent to the electronics unit 22 in bridge 10A as shown in FIG. 3. This unit receives positional voltages from transducer units 70 which may be shaft driven potentiometers coupled to the moveable sections of the bridge 10A. Referring to FIG. 5, $\alpha$ defines the angle between the center line of the passageway 13 and a perpendicular to the terminal 11. A transducer unit 70 mounted in the rotatably fixed section 12 provides a positional voltage $\alpha_v$ proportional to $\alpha$. $\beta$ defines the cab angle which is the angle between the center line of the passageway 13 and a perpendicular to the frontal plane of the cab 14 in which a transducer unit 70 provides a positional voltage $\beta_v$ proportional to $\beta$. $\gamma$ defines the angle between the center line of the passageway 13 and the axle of the wheels 16 as indicated by a transducer unit 70 mounted in the truck 15 which provides a positional voltage $\gamma_v$ proportional to $\gamma$. The positional voltages $\alpha_v$ and $\beta_v$ corresponding to $\alpha$ and $\beta$ are combined by logic units (not shown) in an electronics unit 22 to obtain a calculated positional voltage $\gamma_c$ derived from the following equation:

$$\gamma_c = \beta_v - K(\alpha_v - \beta_v)$$

in which $K$ is a scale factor constant. This positional voltage $\gamma_c$ is combined with the measure positional voltage $\gamma_v$ proportional to $\gamma$ in a difference circuit (not shown) in the electronics unit 22 to yield an error voltage $\gamma_e$. A closed loop servo applies the positional error voltage $\gamma_e$ to the bridge drive system 71 which provides drive signals to the wheels 16 that guide the bridge along a typical path as shown in FIG. 5 thereby nulling positional error voltage $\gamma_e$.

The optical device 21 shown mounted under the cab 14 in FIG. 5 maintains alignment to the marker 33 on the aircraft 37 by providing error signals which are used to control the cab angle $\beta$ and the bridge height. The optical device 21 includes a 60Hz ultraviolet lamp, a collimating lens and a four quadrant photocell as a sensor. The collimating lens produces a 12-inch diameter beam of ultraviolet light which illuminates the marker 33 on the aircraft 37. A 33-inch diameter circle 34 painted with a dull black paint surrounds a strip 35 of retro-reflective material which is 9 inches long and 3 inches wide and is affixed to the aircraft 37 in the vicinity of the door 36. The four quadrant photocell receives only that light which is reflected directly back from the strip 35. Reflected light received in the photocell is optically filtered and focussed onto the detector. The individual voltage output signals of each quadrant of the detector are amplified and filtered so that only the 120 Hz frequency components of the reflected light are passed. An up/down indication is provided by summing the reflected light received in the top two quadrants and comparing it to the sum of the reflected light received in the bottom two quadrants. Likewise, a left/right indication is obtained by summing and comparing the reflected light received by the two left and the two right quadrants. The sum of the reflected light received in all four quadrants yields an indication of the relative distance between the bridge 10A and the aircraft 37 and is used to control the speed of the approach of the bridge 10A until contact is made with the aircraft 37.

Figure 6A:
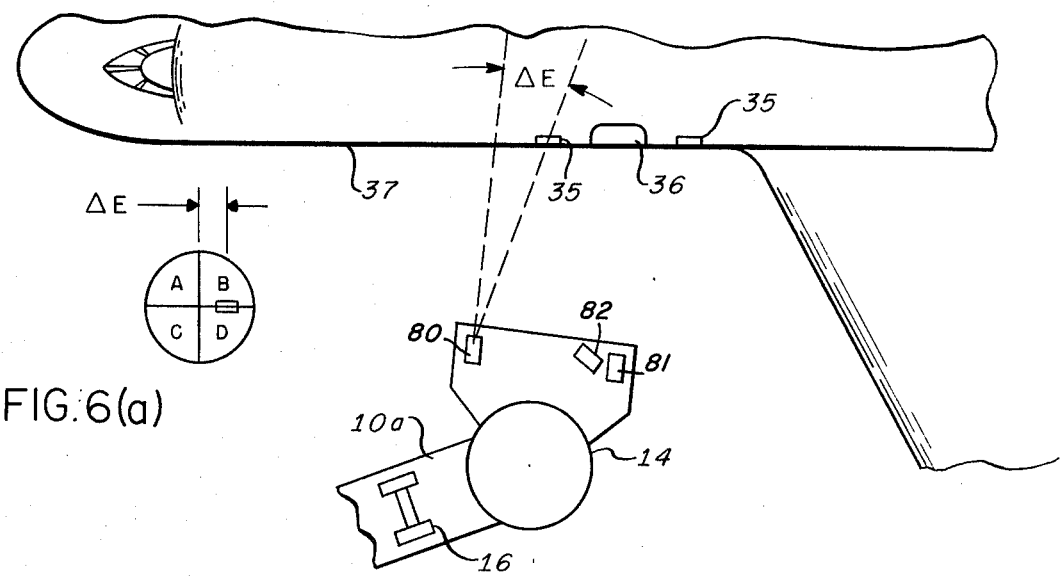
FIGS. 6(a), 6(b), 6(c) show alternate embodiments of an optical sensor used in the invention which includes a plurality of optical devices.
Figure 6B:
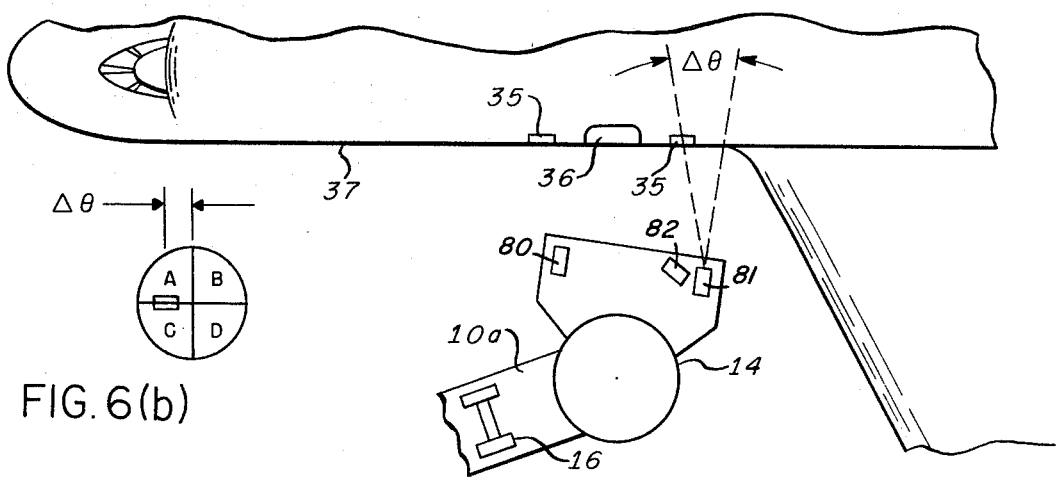
Figure 6C:
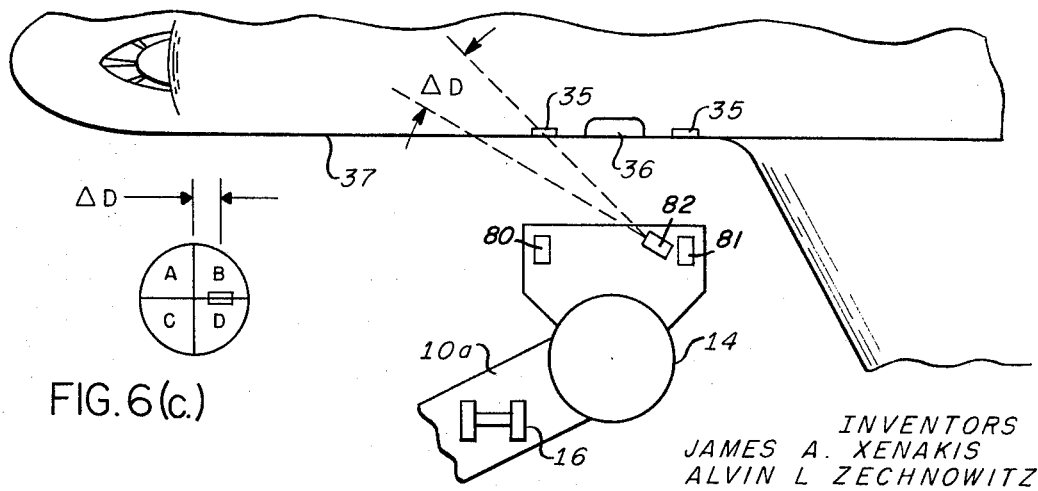

An alternate embodiment of the optical device 21 does not use a collimating lens but employs a pair of luminescent marker strips 35 on each side of the door 36 and eliminates the circular black area 34. When the 60Hz ultraviolet beam illuminates the luminescent marker strips 35, these strips act as a source of yellow light. Three optical sensors each having a four quadrant photocell and optical filters that only permit yellow light to impinge on the photocell are mounted in the cab 14 as shown in FIG. 6. The corresponding error each sensor detects is also shown in FIG. 6. In this embodiment, the bridge is extended until the cab 14 is in line with the door 36. The extension error is detected by a first sensor 80 which is shown as $\Delta E(a)$ in of FIG. 6. This error signal is processed in electronics unit 22 which produces a servo drive signal that is connected to the wheels 16 and reduces the error signal, $\Delta E$, to zero. The cab angle error is detected by a second sensor 81 and is referred to as $\Delta$ ($b$) of FIG. 6. The cab angle error signal is also processed in the electronics unit 22 providing a servo drive signal that rotates the cab 14 until $\Delta = 0$. After the bridge 10A is extended until the cab 14 and the door 36 are in line, that is, $\Delta E = 0$ and $\Delta = 0$, then the wheels 16 are rotated until they are perpendicular to the aircraft 37. The distance between the cab 14 and the aircraft 37 is referred to as the distance closure error $\Delta D$ which is detected by a third sensor 82 as shown in ($c$) of FIG. 6. This error signal is coupled to the electronics unit 22 which produces a servo drive signal to the wheels 16 that drives the bridge 10A towards the aircraft 37 until $\Delta D = 0$. The speed of the bridge 10A is automatically reduced from 17 feet per second to 3 feet per second as the closure error, $\Delta D$, decreases.

Experience has demonstrated that there is a high incidence of damage to both the bridge 10A and the aircraft 37 when the bridge 10A is manually operated. In order to eliminate this problem, the two pairs of pressure switches 23 mounted at each end of the bumper 24 attached to the cab 14 provide a control signal to the electronics unit 22 which stops the movement of the bridge 10A upon contact with the aircraft 37. If the pressure switches 23 on one side of the bumper 24 make contact with the aircraft 37 but those on the other side do not, then drive signals are produced in the electronics unit 22 which rotate and drive the cab 14 forward until the first switch in each pair of pressure switches 23 makes contact with the aircraft 37. Upon precise alignment of the cab 14, with the aircraft 37, all systems are turned off in the electronics unit 22 except those used to control the height of the bridge 10A and the parked light 56 on the control panel 40 is illuminated. As mentioned previously, the optical device 21 provided error signals which were used to control the height of the bridge 10A. After contact is made between the cab 14 and the aircraft 37, the optical device 21 continues to sense changes in the height of the aircraft 37 during deplaning and loading. Signals produced by this sensor are coupled to the electronics unit 22 where drive signals are provided which control the hydraulic cylinders 17 thereby maintaining the cab 14 level with the aircraft 37.

After deplaning and loading operations have been completed, and the door of the aircraft has been closed, the operator presses the stow switch 57 on control panel 40 in FIG. 2b thereby extinguishing the parked light 56 and illuminating the retracting light 58. A three step sequence is used to return the bridge 10A to its original stow position. First, control signals are sent from the control panel 40 to the electronics unit 22 which produces drive signals that move the bridge 10A straight back a fixed distance from the aircraft 37. Second, the bridge 10A is returned from this straight back position to its unstow position and finally the bridge 10A is moved from its unstow position back to its original stow position. No operator intervention is required during the entire three step stow sequence unless a malfunction occurs in the automatic control system.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. In a motorized bridge which has one end rotatably fixed to a terminal, an extendable and retractable passageway connected between said terminal and its other end which is a rotatable cab, said passageway being supported by adjustable hydraulic cylinders on a truck, an improvement control apparatus for providing automated alignment of said bridge with a door on a parked vehicle comprising control signal means for providing initial control voltages to drive motors that maneuver said bridge to a preselected position in response to voltages applied from a remotely located control panel, marker means affixed to said vehicle in close proximity to said door, scanning means attached to said cab for remotely sighting said marker means from said cab, sensing means mounted in said fixed rotatable end, said cab, said passageway and said truck for producing positional voltages in accordance with the spatial position of said bridge relative to said terminal and said cab relative to said marker means, computing means responsive to said positional voltages for producing drive voltages that are coupled to said drive motors which rotate said bridge relative to said terminal, control the height and the length of said passageway, align said cab with said door and abut said cab against said vehicle, and contact switch means affixed to said cab producing an output control voltage in response to said cab contacting said vehicle, said control voltages being applied to said drive motors for rotating said cab until it is parallel to said vehicle, said contact switch means further cooperating with said sensing means and said drive motor means to achieve complete abutment of said cab against said vehicle.

2. Control apparatus as described in claim 1 in which said marker means includes an area that is non-reflective encompassing an area that is retro-reflective.

3. Control apparatus as described in claim 1 in which said marker means is a plurality of areas painted with luminescent paint.

4. Control apparatus as described in claim 1 in which said scanning means is a closed circuit television system having a television camera attached to said cab controllable from a remotely located control panel which includes a television monitor.

5. Control apparatus as described in claim 1 in which said sensing means includes an electro-optical device and transducers.

6. Control apparatus as described in claim 5 in which said electro-optical device is essentially insensitive to ambient light conditions includes a collimated light beam transmitter and a receiver which produces signals indicative of vertical and horizontal misalignment between said marker means and said collimated light beam and signals indicative of the distance between said bridge and said marker means.

7. Control apparatus as described in claim 5 in which said transducers include shaft driven potentiometers coupled to positionable components located in said rotatable end of said bridge, said rotatable cab, said hydraulic cylinders and said truck thereby providing voltage signals that define the spatial position of said bridge as determined by said positionable components.

8. Control apparatus as described in claim 1 in which said sensing means includes a plurality of electro-optical devices and transducers.

9. Control apparatus as described in claim 8 in which said plurality of electro-optical devices include an ultraviolet light transmitter and a plurality of receivers which produce signals indicative of horizontal, angular and vertical misalignment between said marker means and said sensing means and signals indicative of distance between said bridge and said marker means.

10. Control apparatus as described in claim 1 in which said computing means includes logic circuits that process said positional voltages in accordance with a guidance equation producing control voltages that are applied to said truck for steering said bridge along a path that will bring said cab into alignment with said door and in contact with said vehicle.

11. Control apparatus as described in claim 1 in which said contact switch means includes pressure switches disposed along the lower edge of said cab for sensing contact with said vehicle providing control signals that cause said cab to rotate and move forward until it is properly mated with said vehicle producing a park indicator signal that is coupled to said remotely located control panel.

* * * * *